J. G. EVENDEN.
Apparatus for Drawing Oils from Cans.

No. 140,022.  Patented June 17, 1873.

Witnesses.  
C. F. Brown  
Melville Church

Inventor  
J. G. Evenden  
by his Attys.  
Hill & Ellsworth

United States Patent Office

JOHN G. EVENDEN, OF CHICAGO, ILLINOIS, ASSIGNOR TO HIMSELF AND F. CORTEZ WILSON, OF SAME PLACE.

IMPROVEMENT IN APPARATUS FOR DRAWING OIL FROM CANS.

Specification forming part of Letters Patent No. 140,022, dated June 17, 1873; application filed May 22, 1873.

*To all whom it may concern:*

Be it known that I, JOHN G. EVENDEN, of Chicago, in the county of Cook and State of Illinois, have invented a new and Improved Oil-Pump; and I do hereby declare the following to be a full and exact description of the same, reference being had to the accompanying drawings forming part of this specification, in which—

Figure 1:
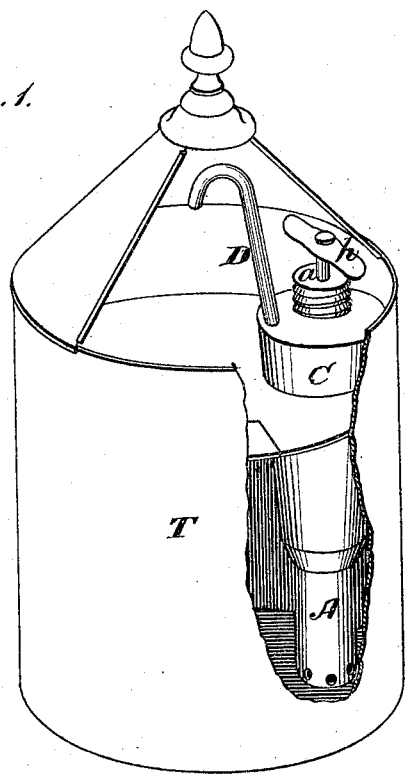
Figure 2:
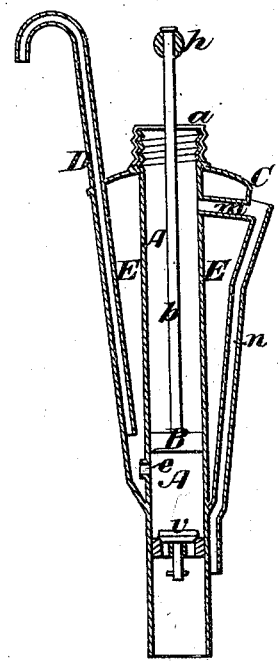

Figure 1 is a perspective view, and Fig. 2 a vertical section.

Similar letters of reference in the accompanying drawings denote the same parts.

The object of this invention is to provide for the public an improved pump, adapted for use in connection with oil-tanks and other vessels for containing liquids, said pump to be so constructed as to operate easily, throw a continuous stream by means of a single plunger, and be free from any leakage of the oil or other liquid around the plunger-rod. To this end the invention consists in the improved construction and combination of parts, as I will now proceed to describe.

In the drawings, T is the oil-tank, preferably of the form shown in W. C. Strickler's patent of August 20, 1872, although any other form of tank or can for oil or other liquids may be used if preferred, instead of the Strickler tank.

A is the straight tubular cylinder of the pump, covered at its upper end by a screw-cap, $a$, or by other suitable means, so as to be as nearly as possible air-tight, and provided with a valve, $v$, and a single plunger, B, attached to a stem or rod, $b$, and actuated by means of a handle, $h$. Around the upper portion of the cylinder A is a tapering air-tight jacket, C, preferably of the form shown in the drawings, although other forms may be employed, if for any reason preferred. This jacket is attached to the cylinder which extends vertically through it, and both cylinder and jacket thus attached are adapted to be set into an opening in the top of the tank or vessel, the tapering form of the jacket enabling them to fit openings of various sizes. The chamber E within the jacket and around the cylinder receives the oil, which is discharged into it through an opening, $e$, in the wall of the cylinder near the lower end of the chamber, and between the valve $v$ and the plunger B. D is the discharge-spout, extending nearly down to the lower end of the chamber, and $m$ is an escape-pipe or drip-tube, extending from the wall of the cylinder, nearly at the upper end of the chamber E, out through the wall of said chamber, so as to discharge into a tube or channel, $n$. The latter is preferably open at its upper end, and extends down the side of the jacket and cylinder, as represented in the drawings, in order to deliver back into the tank such oil as may get above the plunger in the cylinder A. The arrangement of the cylinder in the axial line of the air-chamber E is such as to permit the use of a large air-chamber without taking up much room, and the air-chamber E, thus arranged, accommodates the discharge-spout and drip-tube without taking any additional space for that purpose.

The whole is cheaply constructed, and is adapted, when used with the Strickler tank, to be completely covered and concealed by the conical top of the tank.

Having thus described my invention, what I claim as new is—

1. In a hand-pump for liquid-vessels, the combination of a pump-cylinder with an air-chamber surrounding the cylinder, substantially as and for the purpose described.

2. In a hand-pump for liquid-vessels, the combination of a pump-cylinder, an air-chamber, and a drip-tube extending from the upper end of the cylinder down below the point where the pump passes through the head of the tank or vessel, substantially as described, for the purpose specified.

3. In a hand-pump for liquid-vessels, a combined air-vent and drip-tube, substantially as described, for the purpose specified.

4. The combination of a tapering jacket, C, with a pump-cylinder, A, extending longitudinally through the jacket, substantially as and for the purpose specified.

5. The combination of the pump-cylinder A, the tapering jacket C surrounding the cylinder, the discharge-spout D, the drip-tube and air-vent $m$ $n$, and the plunger, valve, and opening from the cylinder into the air-chamber, substantially as described, for the purpose specified.

JOHN G. EVENDEN.

Witnesses:
F. CORTEZ WILSON,
D. E. M. CONKEY.